US008606423B2

(12) United States Patent
Brian et al.

(10) Patent No.: US 8,606,423 B2
(45) Date of Patent: Dec. 10, 2013

(54) HEG—SINGLE PRIMARY NETWORK TO MULTIPLE SECONDARY NETWORK ENERGY MANAGEMENT

(75) Inventors: Joseph Mark Brian, Louisville, KY (US); Michael Francis Finch, Louisville, KY (US); Natarajan Venkatakrishnan, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/008,168

(22) Filed: Jan. 18, 2011

(65) Prior Publication Data
US 2012/0029714 A1    Feb. 2, 2012

(51) Int. Cl.
*G06F 19/00*    (2011.01)
*G01F 15/06*    (2006.01)

(52) U.S. Cl.
USPC ......... 700/295; 700/22; 700/291; 340/870.02

(58) Field of Classification Search
USPC .......... 700/295, 296; 702/60, 62; 340/870.02
See application file for complete search history.

(56) References Cited

U.S. PATENT DOCUMENTS

| 6,862,498 | B2* | 3/2005 | Davis et al. ............... 700/295 |
| 7,289,887 | B2* | 10/2007 | Rodgers ..................... 700/295 |
| 7,715,951 | B2* | 5/2010 | Forbes et al. .............. 700/291 |
| 7,880,641 | B2* | 2/2011 | Parris et al. ............. 340/870.02 |
| 8,103,389 | B2* | 1/2012 | Golden et al. ............. 700/295 |
| 2008/0238710 | A1* | 10/2008 | Tolnar et al. .............. 340/870.01 |
| 2008/0272934 | A1* | 11/2008 | Wang et al. .............. 340/870.11 |
| 2011/0196547 | A1* | 8/2011 | Park et al. ................. 700/296 |
| 2011/0258572 | A1* | 10/2011 | Fedosseev et al. ........... 715/771 |
| 2011/0314163 | A1* | 12/2011 | Borins et al. .............. 709/227 |
| 2012/0022700 | A1* | 1/2012 | Drees et al. ............... 700/276 |
| 2012/0054852 | A1* | 3/2012 | Gibbs et al. ................. 726/15 |

* cited by examiner

*Primary Examiner* — Dave Robertson
(74) *Attorney, Agent, or Firm* — Global Patent Operation; Marc A. Vivenzio

(57) ABSTRACT

A method and system is disclosed that includes a central controller that communicates data available from an Energy Services Interface (ESI) to devices over multiple secondary networks of a home in different communication protocols. The controller is a home energy gateway that includes multiple communication modules for binding to a meter on a primary network and to form multiple secondary networks.

18 Claims, 2 Drawing Sheets

HEG—SINGLE PRIMARY NETWORK TO MULTIPLE SECONDARY NETWORK ENERGY MANAGEMENT

BACKGROUND

This disclosure relates to energy management, and more particularly to energy systems and methods with time of use (TOU) and/or demand response (DR) energy programs. The disclosure finds particular application to utility systems and appliances configured to manage energy loads to consumers through a communicating consumer control device, such as a home energy manager (HEM), programmable communicating thermostat (PCT), appliance controller, or the like.

Demand response (DR) appliances are configured to respond to incoming signals from utilities (e.g., for a load shedding event), and/or user inputs for modifying the operation of the appliance (e.g., for energy savings). Coupled with DR appliances, a home energy manager (HEM) or home energy gateway (HEG) of a home network provides feedback to a user regarding the performance of the appliances. For example, a user may be able to monitor and/or modify the appliances' responses as well as get feedback on power consumption. In order to reduce high peak power demand, many utilities have instituted time of use (TOU) metering and rates, which include higher rates for energy usage during on-peak times and lower rates for energy usage during off-peak times. As a result, consumers are provided with an incentive to use electricity at off-peak times rather than on-peak times and to reduce overall energy consumption of appliances at all times.

There is a need to provide a system that can automatically operate power consuming devices during off-peak hours in order to reduce consumer's electric bills and also to reduce the load on generating plants during on-peak hours. Active and real time communication of energy costs and consumption of appliances to the consumer will enable informed choices of operating the power consuming functions of the appliance.

Further, to better communicate between appliances of a home and inform the user about energy costs and usage there is a need to communicate to all inputs of devices within the home regarding TOU and DR schedules or other information to the user. This disclosure provides ways of communicating this data to all appliances as well as the user.

SUMMARY

More specifically, this disclosure provides an energy management system that can communicate to any device among multiple types of home networks at a home. The system has a home energy gateway that obtains power/energy data, demand response data, or other like data available at an energy services interface (ESI) and then makes the data available to the appliances on the network. The ESI, for example, passes price information, price tier information, messages, and load control commands from the utility to the energy gateway and ultimately to devices at the home, such as the appliances. A primary network (e.g., a Zigbee, Wifi, Ethernet, PLC network or the like) includes a smart meter in communication with a utility, for example, and the home energy gateway. The power/energy data is available on the primary network from the smart meter, which measures power/energy consumption or other like functions for the home. The ESI data (e.g., price tier, price, messages, load control events, and the like) is repeated to one or more secondary networks having devices bound on the secondary networks respectively.

In one embodiment, multiple secondary networks are in communication with the home energy gateway and include smart devices, such as smart appliances, load switches, thermostats, or demand response appliances and the like. The devices each include a device controller and a communications module. The devices are capable of controlling their electrical load. The devices on each secondary network receive the ESI information that is received on the primary network and use this information to modify their energy use profile.

In another embodiment, a method for communicating data among a plurality of energy consuming devices within different secondary home networks is disclosed. The method includes an energy management system comprising a central controller with at least one memory storing executable instructions. The method comprises obtaining data, such as ESI data (e.g., price tier, price, messages, load control events, and the like) for the plurality of energy consuming devices at the smart meter and communicating the ESI data to the devices on a plurality of home networks.

DETAILED DESCRIPTION

The present disclosure enables a controller of a home, such as a home energy gateway (HEG) or the like to communicate with multiple communication interfaces, and use those interfaces to expand system network topologies for dissemination for smart grid messaging. For example, the HEG contains multiple interfaces for one or more communication protocols for Wired Ethernet, Wifi (802.11 b/g/n), Zigbee Radios, Power Line Carrier (PLC) communications or the like. A message is received over a primary network interface (e.g., Ethernet, Wifi, Zigbee, PLC, etc.) and the message is reflected to at least two separate home area networks (HANs) within a particular home. For example, the appliances may communicate on a PLC network with the HEG, while a Smart Thermostat of the home may be communicating via Zigbee radios to the HEG. In this manner, multiple different communicating devices are able to join to a primary network of the home and communicate thereat for energy management.

Figure 1:
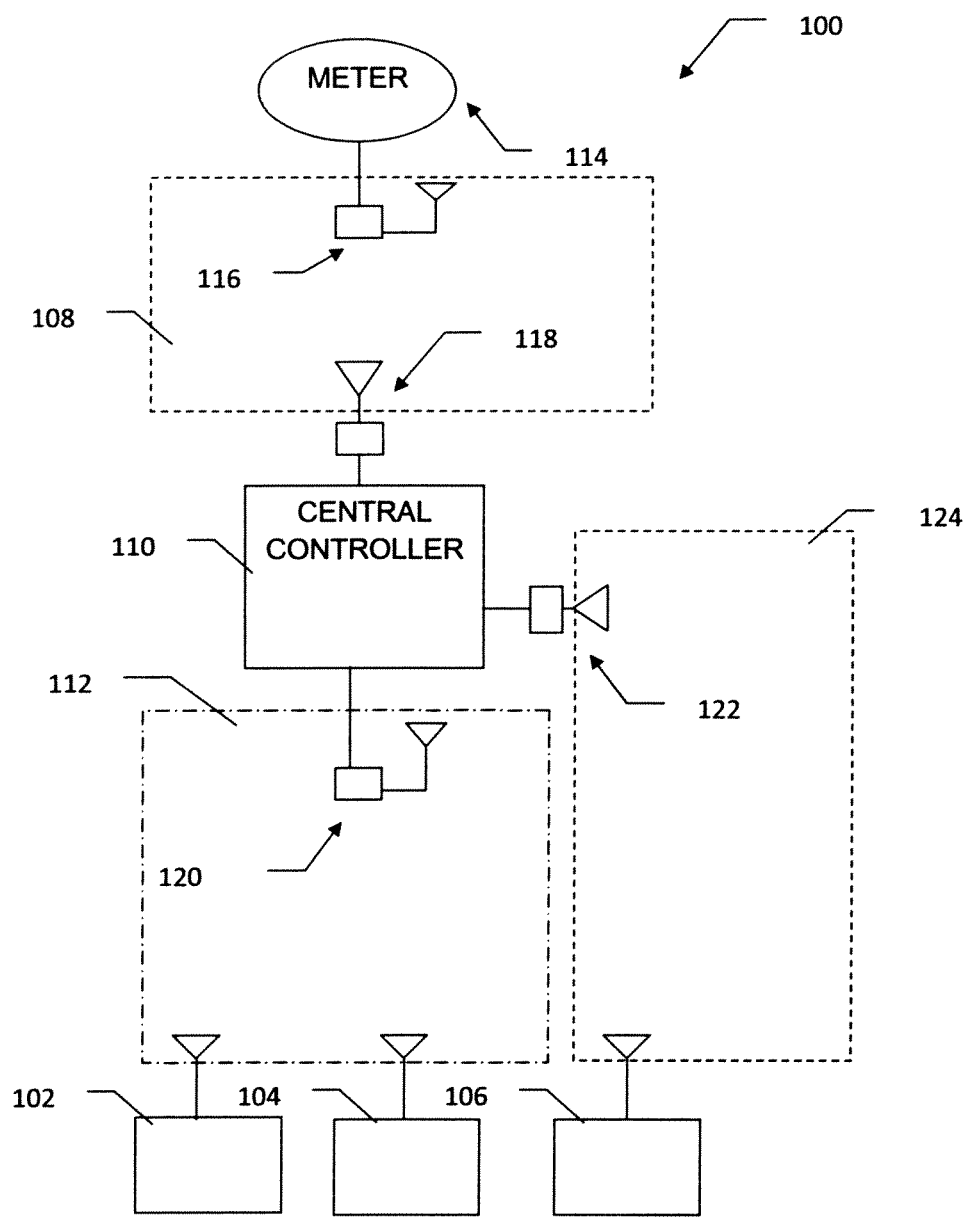
FIG. 1 is a schematic illustration of an energy management system.

FIG. 1 schematically illustrates an exemplary home energy management system 100 for one or more energy consuming devices, such as devices 102, 104, 106 according to one aspect of the present disclosure. Each of the devices 102, 104, 106 can comprise one or more devices with one or more power consuming features/functions. For example, device 102 may be an appliance communication module with a processor or device controller, while devices 104 and/or device 106 may be a refrigerator, an HVAC system, a pool pump and/or any other energy consuming device capable of having power consumption measured at different times of operation or receiving commands to alter the energy use profile. The devices, for example, may also be controllers, or other energy consuming devices other than appliances, such as a programmable communicating thermostat that communicate on different networks.

The home energy management system 100 comprises a central controller 110 for managing power consumption within a household. The controller 110 is operatively connected to each of the devices 102, 104, and 106 with power consuming features/functions within the secondary networks 112, 124 and to an energy services interface of an energy provider via a primary network 108. The controller 110 can include a micro computer on a printed circuit board, which is programmed to selectively send signals to a device control board (not shown) of device 102, 104, and/or 106 respectively in response to the input signal it receives. For example, DR (Demand Response) signals may be received from the ESI and communicated to the device controllers for the devices in the secondary networks by the device controller, which in turn, are operable to manipulate energizing of the power consuming features/functions of their respective devices. For example, the device controller controls the power consumption by turning the respective device and different features on, off, or operates the device at a fraction of the full power.

The central controller 110 is a home energy gateway (HEG), for example, with a memory for processing and storing data, such as time of use (TOU) and/or demand response (DR) program data. The central controller 110 is operable as a gateway device between a utility provider and appliances within the home. For example, the central controller 110 operatively couples the primary network 108 with a secondary network 112 and at least one other different secondary network 124.

The primary network 108 includes a meter 114, such as a "smart" electric meter that operates to communicate with an Energy Services Interface (ESI) (not shown) of a utility provider, for example, and with the central controller 110. The ESI is a communication portal from a utility provider to the smart meter 114. The ESI of a utility, for example, can send messages, price, price tiers, and load control commands to the smart meter, which passes along the data to the central controller 110 and one or more secondary networks 112 and/or 124. The devices on the secondary networks each act on data passed along to it from the ESI. The primary network 108 thus provides a link from the meter 114 to the central controller 110, and is the primary or first network of at least two networks within the home.

In one embodiment, the primary network 108 is a Zigbee network that communicates data in a Zigbee protocol format to communicating devices within the network, such as the central controller 110. The primary network 108 may also be a wired Ethernet network, a WiFi network (e.g., 802.11 b/g/n), or a Power Line Carrier network that communicates in respective protocol formats to devices within the network such as the controller 110 or other devices 102, 104, or 106 through the controller 110.

Communication is facilitated in the system 100 by one or more communication modules, such as wireless and/or wired transceivers. For example, a first communication module 116 is operatively coupled to the meter 114 for communicating within the primary network 108 to the central controller 110 with a communication module 118 thereat. The first module 116 is communicatively connected to the meter, which measures whole-home energy consumption and functions as the network coordinator for the primary network 108. The modules are configured to provide communication on the primary network 108 with at least one communication protocol, as discussed above, which comprises a Zigbee, an Ethernet, a WiFi (e.g., 802.11 b/g/n), and a Power Line Carrier communication protocol, for example. This disclosure is not limited to any one particular communication protocol and other communication protocol formats may also be utilized as one of ordinary skill in the art can appreciate.

The meter or other devices 114 communicatively links the primary network 108 with the utility data center(s) or energy providers. Information from the meter is sent to the central controller 110 where it is stored in a local database, for example. The central controller 110 can then make energy management decisions based on this information. The central controller 110 uses the information received from the ESI along with power consumption information for the home to make energy management decisions that are reflected to devices on the secondary networks. The energy consumption data is used in internal algorithms of the central controller 110 and is used to populate data screens in client applications, for example.

As stated above, homeowners need to make informed decisions regarding their energy consumption use and cost. In general, a homeowner that is informed of energy consumption, such as their electricity usage, will find ways to reduce consumption. Therefore, devices, such as the devices 102, 104, 106 and any number of devices that may be added to the network, can provide their consumption information through the secondary networks 112 and/or 124. The central controller 110 thus operates as a server on a secondary interface for the secondary networks 112 and 124 of a single home. In other words, the central controller 110 (e.g., an HEG or the like) repeats information communicated to it from the meter 114, such as price events, load control events, or messages, for example, which, in turn, are communicated from the controller to devices within the home, such as devices 102, 104, 106 over multiple secondary networks.

Each device 102, 104, 106 has a communication module, such as a transceiver or the like, for communicating data within secondary networks 114 and 124. For example, demand response data, or TOU data that is provided by the ESI 114, is mirrored from the central controller 110 to different networks in the communication protocol that the devices 102, 104, 106 communicate with over their respective secondary network 112 and/or 124. Because the devices are part of a secondary network not directly administered by a utility, each device is able to process power on and power off states therein. Consequently, each device 102, 104, 106 does not need to be authorized by a utility to join the utility networks or obtain ESI information from the meter 114.

The operation of each device 102, 104, 106 may vary as a function of a characteristic of the utility state and/or supplied energy. Because some energy suppliers offer time-of-day pricing in their tariffs, price points could be tied directly to the tariff structure for the energy supplier. If real time pricing is offered by the energy supplier serving the site, this variance could be utilized to generate savings and reduce load demand. Similarly, if pricing is available for ancillary services, such as providing spinning reserve or frequency regulations, the loads and generation sources in the home may respond in a manner to generate savings for customers.

If the controller 110 receives and processes an energy signal indicative of a peak demand state or high energy price or period at any time during operation of the appliances 102, 104, 106, the controller makes a determination of whether one, more, or all of the power consuming features/functions of each appliance should be operated in the energy savings mode and if so, it signals the appropriate device to begin operating in the energy savings or deferral mode in order to reduce the instantaneous amount of energy being consumed. The controller 110 is configured to communicate with the appliance control board or device controller of the device to provide command instructions for the appliance control board to govern specific features/functions, for example, to operate at a lower consumption level or defer operation and determine what the lower consumption level should be. This enables each device or appliance to be controlled by the appliance's controller where user inputs are being considered directly, rather than invoking an uncontrolled immediate termination of the operation of specific features/functions of an appliance from an external source, such as a utility. It should be appreciated that the controller 110 can be configured with default settings that govern normal mode and energy savings mode operation. Such settings in each mode can be fixed, while others are adjustable to user preferences to provide response to load shedding signals.

In one embodiment, the central controller 110 operates as a data server embodied with a client application (not shown). The central controller 110 provides data received from devices within the home to the client application, which in turn formats the data to be presented to the user, such as in graphs or other type of displays.

The central controller 110 comprises multiple communication modules, such as a first communication module 118, a second communication module 120 and third communication module 122 that is different from the second module 120. The second communication module 120 of the central controller 110 communicates to the devices 102, 104, while the third communication module 122 communicates with device 106, which may comprise any number of devices. The number of home area networks in communication with the central controller is not limited to any one network, but include multiple secondary networks that communicate within a single home to the central controller 110 and to devices within other networks of the home. Both the first 118, second 120 and third 122 communication modules operate as an interface whereby the first communication module 118 facilitates communications to and from the smart meter 114 with a communication module 116 for receiving data from and transmitting data to an energy provider. These interfaces may be interface radios that are ZigBee, WiFi, Power Line Carrier, Ethernet devices, or any other communication protocol device, for example, that forms more than two networks (e.g., the primary and the secondary networks) at a home. The central controller 110 can also include ports, such as USB or Ethernet for adding additional functionality.

The central controller 110 is operable as an HEG with multiple communication interfaces thereat, such as communication modules 118, 120 and 122. These communication interfaces are used to expand the home area network of a home for different network topologies to be used for dissemination of smart grid messaging. For example, the controller 122 includes interfaces for wired Ethernet, Wifi (802.11 b/n/g), Zigbee, RF, Power Line Carrier communications, and any other communication protocol for communication. A message is received over the primary network 108 on a communication module 118 and the message is processed to at least two separate home area networks of a home. For example, appliances may be communicating on a PLC network (e.g., the network 112) with the controller or home energy gateway 110, while a smart thermostat device (e.g., device 106) communicates via Zigbee radios with the controller on a different secondary network 124, such as a Zigbee network. In bound messages are therefore received from a utility provider on a primary network, and then repeated to at least two separate physical networks within a home in order to facilitate energy management at the home.

Figure 2:
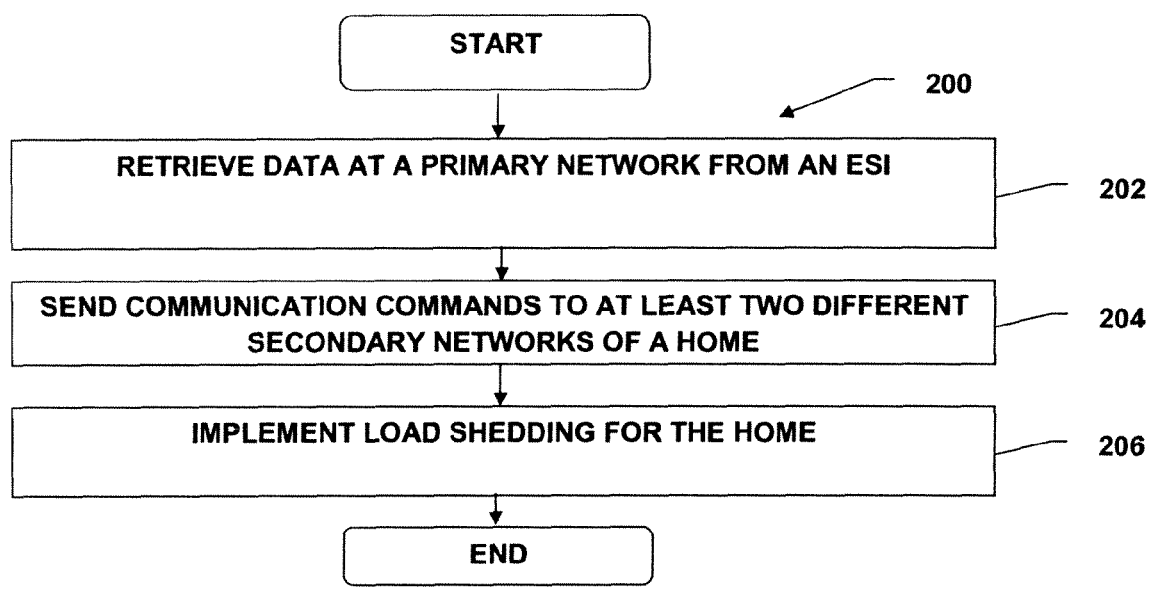
FIG. 2 is a flow diagram illustrating an example methodology for implementing an energy management system with a plurality of energy consuming devices having different components.

Example methodology 200 for sending energy management signals to particular energy consuming device among a plurality of energy consuming devices with a home network is illustrated in FIG. 2. While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Referring now to FIG. 2, is an exemplary method for an energy management and monitoring system of a home. The home includes a central controller 110, such as a home energy gateway, in which energy information is communicated through to the home. The controller is a processor, for example, that links more than two networks at the home, a primary network 108 and at least two secondary networks 112 and 124, for example. The controller 110 is coupled to at least one memory storing executable instruction or software and is operatively coupled to a power/energy measuring device that measures power consumed at the home and is in communications with an ESI of a utility provider.

At 202 data is received in a primary network 108 of a home. The data communicated to the network is provided via an ESI of a utility, for example. The energy provider or utility provider may communicate data in any communication protocol, such as a Zigbee communication protocol. A communication interface module, such as the meter 114, transmits the message received to a central controller 110, which then provides the data to two or more secondary networks at the home with different communication protocol formats for communicating to devices linked to the respective network. The network communication protocol that communicates the data from the controller to the secondary networks at 204 may vary depending on communication modules that communicate to the devices linked to each network. For example, while one secondary network communicates in a Zigbee cluster communication protocol, another different secondary network might communicate in a Wifi protocol or a different communication protocol.

At 206, load shedding for the home is implemented from data communicated to the devices on the secondary networks that informs the home of time of use or demand response schedules in order for the home to save energy or defer consumption. For example, a pre-determined load shedding can be implemented for an electrical load of the home from electricity rates and/or schedules retrieved from the data via the communication commands.

In one embodiment, the controller communicates with the ESI of a utility through the power/energy measuring device 114 and provides real time data to the energy consuming devices of each secondary network for the purposes of managing energy consumption. The controller stores information provided by the ESI along with energy consumption data measured, and later retrieved, which enables a user of the home to observe or track their consumption. The meter is within the primary network and is configured to be an interface device between the home devices and a utilities network. The meter includes a communication module, such as a Zigbee transceiver or other transceiver (e.g., Wifi, PLC, RF, Ethernet or the like) that communicates metering data or demand response commands to the central controller.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An energy management system comprising managed energy consuming devices for a home, the energy management system comprising:
   a primary communication module that is in communication with an energy services interface of an energy provider via a primary network of the home;
   at least two secondary communication modules that are in communication with the managed energy consuming devices of the home via at least two separate secondary networks, the secondary networks having different communication protocols relative to each other; and
   a central controller that is in communication with the primary communication module of the primary network and the at least two secondary communication modules of the at least two secondary networks;
   wherein the central controller is configured to (i) receive energy consumption data from each of the managed devices over the at least two secondary networks via the at least two secondary communication modules, (ii) receive energy provider information over the primary network via the primary communication module, the energy provider information including at least one of electricity rates, price events and load control events sent from the energy provider, and (iii) interpret the energy consumption data in combination with the energy provider information and, based on the interpretation, generate and provide communications or commands to each of the managed devices over the at least two secondary networks via the at least two secondary communication modules to monitor and manage power consuming features/functions of the managed devices.

2. The system of claim 1, wherein the primary communication module is in communication with the energy services interface via a smart meter configured to measure whole home energy consumption and wherein the primary communication module is operative to provide commands to the managed devices via the central controller and the at least two secondary communication modules over the at least two communication networks to regulate energy usage by the managed devices as a function of whole home measured energy consumption and data received from the energy services interface.

3. The system of claim 2, wherein the smart meter communicatively links the primary network of the home with the energy provider, said primary network communicatively linking the smart meter and the primary communication module of the central controller.

4. The system of claim 1, wherein the central controller comprises a home energy gateway device having the primary communication module, and each of the at least two secondary communication modules, together with one or more of the managed energy consuming devices, forms the respective secondary networks.

5. The system of claim 1, wherein the primary communication module is operable as an end point device on the primary network, and each of the at least two secondary communication modules, together with one or more of the managed energy consuming devices, forms the respective secondary networks where the central controller is configured as a server thereto.

6. The system of claim 1, wherein the different communication protocols include at least two of an Ethernet, a Wifi, a Zigbee, and a Power Line Carrier communication protocol.

7. The system of claim 1, wherein the central controller is configured to receive communications from a smart meter configured to communicate within the primary network with the energy services interface, the central controller and to the at least two secondary networks.

8. The system of claim 1, wherein each of the managed devices respectively comprises a demand response appliance configured to manage power consumption by responding to communications or commands from the central controller, and wherein the central controller is configured to receive the electricity rates and schedules from the energy provider via the primary communication module over the primary network to implement pre-determined load shedding for an electrical load of the home.

9. A method for communicating data among at least two energy consuming devices in a home comprising:
   receiving energy consumption data at a central controller from each of the at least two energy consuming devices over at least two secondary networks of the home having different communication protocols relative to each other;
   receiving energy provider information at the central controller from an energy services interface of an energy provider over a primary network of the home, the energy provider information including at least one of electricity rates, price events and load control events sent from the energy provider;
   interpreting by the controller the energy consumption data in combination with the energy provider information; and
   based on the interpretation, generating and providing communications or commands to each of the at least two energy consuming devices over the at least two secondary networks to monitor and manage power consuming features/functions of each of the at least two energy consuming devices.

10. The method of claim 9, comprising:
    implementing a pre-determined load shedding for an electrical load of the home from the electricity rates and/or schedules retrieved from the data via the communications or the commands.

11. The method of claim 10, comprising:
    communicating with a smart meter via the primary network and providing commands to regulate energy usage to the at least two energy consuming devices as a result of whole home measured energy consumption stored at the central controller.

12. The method of claim 9, comprising:
    communicating to the at least two secondary networks in the different communication protocols that include at least two of an Ethernet, a Wifi, a Zigbee, and a Power Line Carrier communication protocol.

13. The method of claim 9, comprising:
    retrieving electrical rates and/or schedules from a smart meter that communicates on the primary network with the energy services interface of the energy provider and to the central controller via a first communication module of the primary network.

14. The method of claim 13, wherein the central controller includes a home energy gateway device with the first communication module and at least two secondary communication modules of the at least two secondary networks that respectively comprise a transceiver device for communicating in the different communication protocols including an Ethernet, a Wifi, a Zigbee, or a Power Line Carrier communication protocol.

15. A home energy gateway device for a home energy management system, comprising:
    a first communication module communicatively connected to an energy/power meter that obtains energy provider data or ESI data for a plurality of energy consuming devices of a home and is an end point device on a primary network;

a second communication module communicatively connected to at least one of a first set comprising some of the plurality of energy consuming devices comprising a first secondary network;

at least one additional communication module communicatively connected to at least one of a second set of the plurality of energy consuming devices comprising a second secondary network having a communication protocol that is different from the first secondary network; and a controller operatively connected to the first communication module, the second communication module and the at least one additional communication module;

wherein the controller is configured to (i) receive the energy consumption data from each of the plurality of energy consuming devices over the first secondary network and the second secondary network via the second communication module and the at least one additional communication module, (ii) receive the energy provider data or the ESI data over the primary network via the first communication module, the data including at least one of electricity rates, price events and load control events sent from an energy provider, and (iii) interpret the energy consumption data in combination with the energy provider data or the ESI data and, based on the interpretation, generate and provide communications or commands to each of the plurality of energy consuming devices over the first secondary network and the second secondary network via the second communication module and the at least one additional communication module to monitor and manage power consuming features/functions of the plurality of energy consuming devices.

16. The device of claim 15, wherein the controller is configured to coordinate the managed energy consuming devices as a server for the first and second secondary networks.

17. The device of claim 15, wherein at least one of the managed devices comprise a demand response appliance configured to manage power consumption by responding to the communications from the controller.

18. The device of claim 15, wherein the controller is configured to receive the electricity rate and/or schedule information from the energy provider to communicate pre-determined load shedding commands for an electrical load of the energy consuming devices at the home.

* * * * *